United States Patent [19]

Tanaka et al.

[11] Patent Number: 4,548,632

[45] Date of Patent: Oct. 22, 1985

[54] PROCESS FOR PRODUCING FINE FIBERS FROM VISCOUS MATERIALS

[75] Inventors: Keihachiro Tanaka, Itami; Shigekazu Yoshii, Nishinomiya, both of Japan

[73] Assignee: Nippon Sheet Glass Co., Ltd., Osaka, Japan

[21] Appl. No.: 660,486

[22] Filed: Oct. 11, 1984

[30] Foreign Application Priority Data

Oct. 19, 1983 [JP] Japan .................. 58-195797

[51] Int. Cl.⁴ .................................. C03B 37/04
[52] U.S. Cl. .................................. 65/5; 65/16; 264/12; 425/7
[58] Field of Search .............. 65/5, 16; 264/12; 425/7

[56] References Cited

U.S. PATENT DOCUMENTS

| 4,185,981 | 1/1980 | Ohshato et al. ................ 65/5 |
| 4,268,293 | 5/1981 | Levecque et al. ............... 65/5 |

FOREIGN PATENT DOCUMENTS

| 1177874 | 4/1959 | France ................ 65/5 |
| 53-49126 | 5/1978 | Japan ................. 65/5 |
| 53-81728 | 7/1978 | Japan ................. 65/5 |

Primary Examiner—Robert Lindsay
Attorney, Agent, or Firm—Wenderoth, Lind & Ponack

[57] ABSTRACT

A process for producing fine fibers, which comprises
(1) allowing a viscous material to flow out from a flow-out orifice,
(2) blowing a rectilinear first high-speed gas stream from each of at least three circumferentially spaced gas jet nozzles disposed around the flowout orifice to reduce abruptly the cross-sectional area of a first fine stream of the viscous substance that has flowed out, and to form a second fine stream of the viscous material, and
(3) blowing a second high-speed gas stream against said second fine stream from across the axis of the first fine stream of the viscous material at a position downstream of that position at which the first high-speed gas stream most approaches the axis of the first fine stream of the viscous material, thereby to thin the second fine stream further.

3 Claims, 3 Drawing Figures

PROCESS FOR PRODUCING FINE FIBERS FROM VISCOUS MATERIALS

This invention relates to a process for producing fibers from a viscous material such as molten glass or plastics, particularly glass fibers from a highly viscous glass melt. More specifically, it relates to the production of ultrafine fibers having a diameter of less than 2 to 3 microns.

In recent years, the work of assembling electrical component parts such as IC and LSI and precision component parts of watches and cameras has been done in a so-called clean room free from dust and dirt and controlled in temperature and humidity in order to prevent a reduction in the performance of these articles. Such a work is expected to increase further in the future. To clean the working room by removing dust and dirt, fine glass fibers are frequently used as filters, and the demand for such fibers will further increase in the future. There is also an increaseing requirement for higher qualities of these fibers. The glass fibers used in such dust-removing filters usually have a diameter of 0.2 to 3 micrometers, although the diameter differs according to the quality required.

On the other hand, lead batteries used for automobiles or autocycles include a dilute sulfuric acid solution as an electrolyte solution. Since the solution often leaks by vibration or tumbling, there has been an inconvenience of charging a fresh supply of it occasionally. Recently, a method for preventing leakage of the electrolyte solution in the event of tumbling has been developed in which glass fibers impregnated with a dilute sulfuric acid solution are disposed between electrodes. Hence, the demand for glass fibers for use in batteries has also tended to increase.

The glass fibers used for air filters or batteries are short fibers having a diameter of as small as 0.2 to 3 micrometers which is about 1/50 to ⅓ of that of thermally insulating glass fibers used in general houses.

The following processes for producing short glass fibers have previously been known.

(1) Steam-blown process

Steam jets under high pressure are blown against downwardly flowing molten glass to blow away the molten glass and attenuate it into glass wool (see J. Gilbert Mohr and William P. Rowe, "FIBER GLASS", Van Nostrand Reinhold Company, 1978, pages 9–10).

(2) Flame attenuation process

High-speed flame is applied to solid filaments of glass to fiberize them (see ibid., page 10).

(3) Centrifugal process

Molten glass is fiberized by pulling it away by a centrifugal force and further applying high-speed air streams to it (see ibid., pages 12–13).

(4) Toration process

A molten glass stream is introduced into high-temperature high-speed gas streams as second jet streams by high-temperature high-pressure gas streams flowing along the molten glass stream, and fiberized into fine fibers by the second jet streams (see ibid., page 11, and Japanese Patent Publication No. 43932/1977 corresponding to U.S. Pat. No. 3,874,886).

(5) RGJ process (rotary gas jet process)

A plurality of high-temperature high-pressure gas streams are blown in the form of a whirl against a molten glass stream to attenuate the glass (see Japanese Laid-Open Patent Publication No. 25113/1977 and Japanese Patent Publication No. 17855/1982 and U.S. Pat. Nos. 4135903, 4185981, and 4243400).

Glass fibers produced by these processes (1) to (5) are generally suitable for use as thermally insulating materials for general houses, industrial pipings, etc., and have a diameter of about 3 to 20 micrometers.

When these processes are used to produce ultrafine fibers which can be used, for example, in the air filters mentioned above, they present the following problems.

The steam-blown process (1) can attenuate glass down to 3 to 2 microns in diameter, but cannot give finer fibers. It is believed that the glass becomes solidified before the fiber diameter decreases to below that value. Moreover, according to this process, the downwardly flowing glass stream is liable to be broken by the high-speed steam streams, and the glass in the viscous state cannot be well fed to the high-speed steam streams. Consequently, the filaments produced by this process have a non-uniform diameter, and contain many imperfections such as films (flaky glass), balls (ball-like glass) and shots (thick fibers).

In the flame attenuation process (2), primary fibers formed in advance are continuously inserted into high-temperature high-speed air streams to heat-soften the primary fibers and simultaneously draw them by the high-speed air streams. Hence, short fibers having a small diameter and a large length can be obtained. However, the heat energy required for heat-softening and the kinetic energy required for the stretching of the primary fibers must be given simultaneously in order to perform the reheat-softening and the stretching of the primary fibers simultaneously. Thus, in order to supply an energy greater than that required for stretching, the high-speed air streams as a source of such energy must be used in extremely large amounts. Furthermore, since the efficiency of heat conduction from the gas to the glass is poor, the amount of the high-speed gas streams is extremely large beyond expectation.

The process (2) is now the only process by which ultrafine fibers used for the aforesaid filters are industrially produced. To obtain such ultrafine fibers, the diameter of the primary fibers to be inserted into the high-temperature high-speed gas streams should be made more uniform and smaller, and therefore, the amount of the gas required for fiberization further increases. For example, to obtain 1 kg of glass fibers having a diameter of 8 to 9 micrometers, about 1 kg of butane is required for forming the high-temperature high-speed gas streams. In the case of fibers with a diameter of 2 micrometers, 3 kg of butane is required. When fibers having a diameter of 0.6 micrometer are desired, the amount of butane required is about 6 kg. To remove this defect, attempts have been made, for example, to preheat the primary fibers before insertion into the high-speed gas streams (for example, U.S. Pat. No. 2,607,075). But the results were not entirely satisfactory.

The centrifugal process (3) involves feeding a heat-softenable material into a rotating disk or spinner, and directing high-speed air streams against streams of thread-like materials emerging from holes or protrusions around the periphery of the disc or spinner by the centrifugal force to thereby blow them away. It is very difficult therefore to obtain glass fibers having a diameter of less than several micrometers. This is presumably because when the glass is about to be attenuated to below several micrometers, the ambient atmosphere is at a low temperature and the glass becomes solidified before it is drawn. Furthermore, since the rotating part is at high temperatures, its deterioration is rapid.

The toration process (4) is an improvement over the aforesaid flame attenuation process. Since in this process the primary fibers are formed from molten glass and then introduced into the high-temperature high-speed gas streams, the glass which has been introduced into the high-temperature high-speed gas streams is already in the softened state, and the high-temperature high-speed gas streams are used exclusively for attenuating the glass. Hence, the thermal efficiency for glass attenuation shows a marked increase over the aforesaid flame attenuation process. According to the toration process, however, the glass to be introduced into the high-temperature high-speed gas streams only forms a single stream flowing downwardly from one glass flowout orifice. When attempts are made to arrange glass flowout orifices in a row substantially perpendicularly to the high-temperature high-speed gas streams, there is a limit to the decreasing of the aligning pitches of the orifices because there is a physical restriction on the production of glass flowout orifices. Accordingly, this process is not entirely satisfactory in regard to thermal efficiency.

The RGJ process (5) is an excellent fiberizing process in regard to thermal efficiency because glass is attenuated by blowing a plurality of high-temperature high-pressure gas streams in the form of a whirl against a molten glass stream flowing down from an orifice. However, when it is desired to obtain fine fibers having a diameter of less than 3 micrometers, it is necessary to reduce the viscosity of the molten glass stream flowing down from the orifice. For this purpose, the temperature of the substrate material of the orifice should be raised. This causes the disadvantage that platinum as the substrate of the orifice experiences temperatures near its use limit. Where glass fibers are required to have chemical resistance, the viscosity of the glass composition becomes higher, and consequently, the aforesaid tendency becomes stronger.

It is an object of this invention to provide a process for industrially producing ultrafine fibers, particularly ultrafine short fibers, from a viscous material efficiently.

Another object of this invention is to provide a process for industrially producing ultrafine short fibers from a viscous material efficiently, which is an improvement over the conventional RGJ process.

According to this invention, these objects and advantages of the present invention are achieved by a process for producing fine fibers, which comprises (1) allowing a viscous material to flow out from a flowout orifice, (2) blowing a rectilinear first high-speed gas stream from each of at least three circumferentially spaced gas jet nozzles disposed around the flowout orifice to reduce abruptly the cross-sectional area of a first fine stream of the viscous substance that has flowed out, and to form a second fine stream of the viscous material having a reduced cross sectional area, said first high-speed gas stream having the following two vector components, (A) a tangential component along the outer circumference of that section of said first fine stream of the viscous substance which crosses the axis of said first fine stream, and (B) a component first gradually approaching the axis of said first fine stream in the flowing direction of the viscous material and then gradually moving away from said axis, and (3) blowing a second high-speed gas stream against said second fine stream of a reduced cross-sectional area from across the axis of the first fine stream of the viscous material at a position downstream of that position at which the first high-speed gas stream most approaches the axis of the first fine stream of the viscous material when viewed in the flowing direction of the viscous material, thereby to thin the second fine stream further.

The invention will now be described in detail partly with reference to the accompanying drawings in which.

Figure 1:
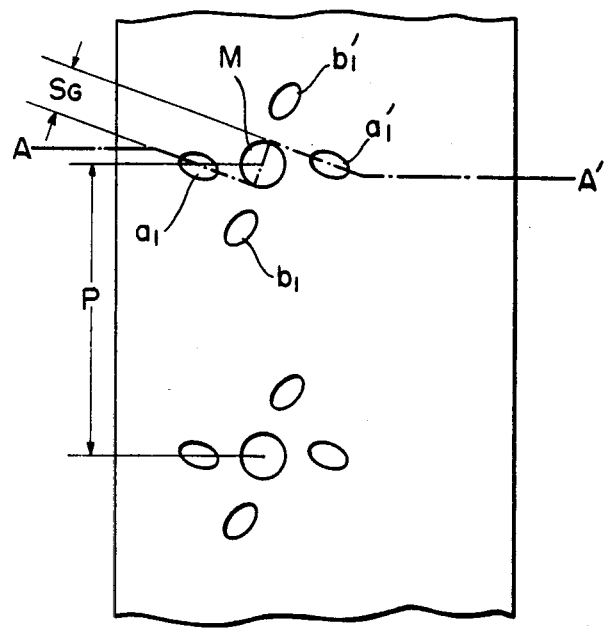
FIG. 1 is a rough partial top plan view of one embodiment of a fiberizing apparatus used in this invention.

The process of this invention basically consists of a first step of allowing a viscous material to flow out from a flowout orifice, a second step of blowing a rectilinear first high-speed gas stream against a fine stream of the visscous material which has flowed out from the flowout orifice to reduce the cross-sectional area of the fine stream abruptly and form a second fine stream, and a third step of further blowing a second high-speed gas stream against the second fine stream to thin the second stream further.

The viscous material is a heat-softenable material such as glass. Flowing out of the viscous substance from the flowout orifice can be carried out, for example in the case of glass, by heat-melting glass in a melting pot to form a viscous material and allowing the viscous material to flow out continuously through a flowout orifice provided for example on the bottom wall of the melting pot. Generally, the flowout orifice has a circular cross-sectional shape, and therefore, the fine stream of the viscous material flowing out from the flowout orifice also has a circular cross-section.

In the second step, the rectilinear high-speed gas stream is blown against the fine stream of the viscous material. Blowing of the high-speed gas stream is carried out by jetting the rectilinear high-speed gas stream from each of at least three gas jet nozzles disposed around the flowout orifice in a circumferentially spaced relationship. Each high-speed gas stream should have a tangential component along the outer circumference of that section of said first fine stream of the viscous substance which crosses the axis of said first fine stream, and a component which first gradually approaches the axis of said first fine stream in the flowing direction of the viscous material and then gradually moves away from said axis.

When the fine stream of the viscous material undergoes the action of at least three rectilinear high-speed gas streams, a moment of rotation about the axis of the fine stream is imparted to the fine stream by the tangential component of the high-speed gas stream. In the meantime, the fine stream is simultaneously drawn in its flowing direction by the other component of the high-speed gas stream. Accordingly, in the vicinity of the position at which the axis of the high-speed gas stream most approaches the axis of the fine stream (to be sometimes referred to as a first convergence point), the fine stream is deformed into the shape of a tapered cone by these high-speed gas streams and abruptly reduced in cross-sectional area. Thus, for example the first fine stream of the viscous material flowing in a diameter of 0.5 to 2.0 mm in the first step is reduced in the second step to about 0.3 mm as the diameter of the tip portion of the conical shape, and is thus converted to a second fine stream having a diameter of about 4 to about 20 micrometers.

Desirably, therefore, the three or more gas jet nozzles for jetting high-speed gas streams are arranged circumferentially symmetrically around the flowout orifice in order to impart a moment of rotation smoothly to the fine stream at the first convergence point.

Those disclosures of U.S. Patent No. 4,135,903 and its corresponding British Pat. No. 1,555,780 which relate to the first and second steps of the present invention are cited herein as part of the disclosure of the present application.

In the third step, the second high-speed gas stream is blown against the second fine stream. This blowing is carried out from across the axis of the first fine stream at position downstream of the position (first convergence point) at which the first high-speed gas stream most approaches the axis of the first stream when viewed in the flowing direction of the first fine stream.

Desirably, the kinetic energy of the second high-speed gas stream per unit volume is lower than the kinetic energy per unit volume of the first high-speed gas stream which has contacted the second high-speed gas stream after collision with the fine stream. In other words, when the first high-speed gas stream has a larger kinetic energy per unit volume than the second high-speed gas stream, the first high-speed gas stream penetrates into the second high-speed gas stream and the second fine stream of the viscous substance carried on the first high-speed gas stream is smoothly introduced into the second high-speed gas stream. Likewise, the cross-sectional area of the second high-speed gas stream is larger than that of the first high-speed gas stream so that the second fine stream can be smoothly introduced into the second high-speed gas stream.

By blowing the second high-speed gas stream against the second fine stream at a position downstream of the first convergence point, the second fine stream reduced in size by the first high-speed gas stream can be further thinned. Furthermore, by blowing the second high-speed gas stream against the second fine stream in a direction crossing the axis of the first fine stream, for example in a direction at right angles to the axis of the first fine stream, a space for providing a gas jet nozzle for jetting the second high-speed gas stream can be easily secured. Moreover, since the flying direction of the second fine stream is varied by the second high-speed gas stream, the second fine stream is further thinned.

When the viscous material is a material maintaining a stable viscous state at high temperatures, for example glass, the second high-speed gas stream is prepared preferably by burning a fuel gas with a molecular oxygen-containing gas having a higher oxygen content than air, preferably a molecular oxygen-enriched gas having an oxygen content of at least 22% by volume, in order to maintain the second fine stream at a temperature high enough to draw it further. The aforesaid molecular oxygen-enriched gas having a high oxygen content can be easily prepared, for example, by mixing air with oxygen, and this offers the advantage that the amount of a gas containing molecular oxygen in an amount required for complete burning of the fuel can be maintained small. Hence, the prepared gas obtained is at a higher temperature than the gas prepared by using air. The use of the prepared high-temperature gas as the second high-speed gas stream can serve to minimize adverse effects which may be caused by the cooling of the first high-speed gas stream by ambient air at lower temperatures which the first high-speed gas stream carries when penetrating into the second high-speed gas stream. Consequently, the second fine stream is maintained at a high temperature sufficient for further drawing by the second high-speed gas stream, and is advantageously converted to ultrafine fibers.

The process of this invention consists basically of the above steps 1 to 3, but it is also possible to carry out the following step 4 between the steps 2 and 3.

Step 4 is carried out by jetting a plurality of auxiliary high-speed gas streams having a second convergence point closest to the axis of the first fine stream below the first convergence point or being substantially parallel to the axis of the flowout orifice from a plurality of auxiliary gas jet nozzles provided outwardly of the aforesaid at least three gas jet nozzles (to be referred to as the first gas jet nozzles) and thereby causing them to meet the second fine stream formed by the first high-speed gas stream before it substantially contacts the second high-speed gas stream. The advantages of using the auxiliary high-speed gas streams are that the second fine stream can be drawn before it is drawn by the second high-speed gas stream, and the second fine stream can be very easily introduced into the second high-speed gas stream by the action of the auxiliary high-speed gas streams.

Thus, according to this invention, the fine stream of the viscous material can be efficiently thinned further by small amounts of gas streams in the second step and optionally in the fourth step as well, and the nozzles for jetting the gas streams can be provided in the vicinity of the flowout orifice for the viscous material. The present invention can therefore very much increase the amount of fibers produced per unit amount of the gases used. Furthermore, since a plurality of flowout orifices can be provided in juxtaposition in this invention, the amount of fibers produced per apparatus can be made very high. Such advantages cannot be achieved by, for example, the toration process.

To facilitate an understanding of the features of the present invention, the process of the invention will now be described with reference to FIGS. 1 to 3.

In FIG. 1, M represents the opening of a flowout orifice 3 for a viscous material, and a first group of gas jet nozzles $a_1$, $b_1$, $a'_1$ and $b'_1$ are arranged nearly symmetrically around the flowout orifice 3 (M).

Figure 2:
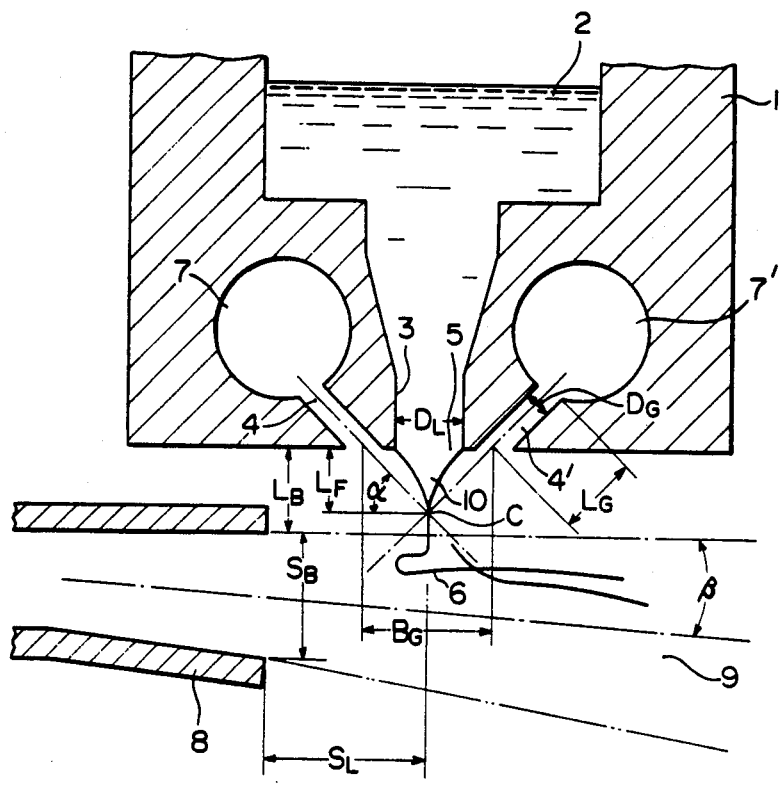
FIG. 2 is a sectional view taken along line A-A' of FIG. 1.

FIG. 2 is a sectional view of FIG. 1 across the first group of gas jet nozzles. FIG. 1 shows four gas jet nozzles. In the fiberizing apparatus used in this invention, it is necessary that the first group of a plurality of the gas jet nozzles should be disposed symmetrically around the flowout orifice. The number of such nozzles is not limited.

If desired, a plurality of auxiliary gas jet nozzles (not shown) may be provided outwardly of the first group of gas jet nozzles. The axes of the auxiliary gas jet nozzles have a second convergence point at which they almost or completely converge on the axis of the flowout orifice, or they may be parallel to the axis of the flowout orifice. The second convergence point exist further below the first convergence point at which the axes of the first group gas jet nozzles most approach the axis of the flowout orifice.

In FIG. 2, the reference numeral 8 represents a gas jet hole (to be referred to as a second blast) in the form of a nozzle or a slit for jetting a second high-speed gas stream 9. Desirably, the upper end portion of the gas jet hole 8 or an extended surface of its inner wall is located slightly below the convergence point of the axes of the first gas jet nozzles 4 and 4'. If the upper end portion of the second blast is located above the convergence point of the axes of the first gas jet nozzles, the conical shape 10 of the viscous material stream 5 is disturbed by the action of the second high-speed gas stream 9, and the flow becomes non-uniform. Consequently, the viscous material remains partly unfiberized.

Accordingly, a fine stream 5 which has been given a rotating force by the first high-speed gas stream jetted from the first group of gas jet nozzles $a_1$, $a'_1$, $b_1$ and $b'_1$ (FIG. 1) is released at a point past the convergence point C of the first group of gas jet nozzles, and flies radially in a direction perpendicular to the axis of the flowout orifice 3 by its own centrifugal force. A part of it, however, is blown away by the first high-speed gas stream jetted out from the first group of gas jet nozzles $a_1$, $a'_1$, $b_1$ and $b'_1$ and gets into the central portion of the second high-speed gas stream 9 jetted by the blast 8, and thus undergoes the action of the gas stream having a higher speed. On the other hand, that part of the fine stream of the viscous material which is not carried on the first high-speed gas stream jetted out from the first group of the gas jet nozzles $a_1$, $a'_1$, $b_1$ and $b'_1$ goes into a lower speed zone of the second high-speed gas stream 9 or a concurrent stream of air. Since the portion of the fine stream which has got into the central portion of the second high-speed gas stream 9 is continuous to the portion which has got into the lower speed zone or the concurrent stream of air, they are both stretched and thinned although within different time periods after they have got into the second high-speed gas stream 9. Advantageously, the amount of motion of the first high-speed gas stream jetted from the first group of the gas jet nozzles $a_1$, $a'_1$, $b_1$ and $b'_1$ per unit cross-sectional area is larger than that of the second high-speed gas stream 9. Desirably, the first high-speed gas stream reaches the central zone (where the speed of the gas stream is the highest) of the second high-speed gas stream 9 jetted out from the second blast, and in this case, fine fibers can be easily obtained.

When the auxiliary gas jet nozzles are provided, the gas streams blown from these auxilliary nozzles serve to stuff the fine stream 5 into the central zone of the second high-speed gas stream 9, and make it possible to obtain finer fibers easily. As the speed distribution of the second high-speed gas stream 9 in its cross sectional direction gets broader, finer fibers can be obtained advantageously. The suitable temperature of the second high-speed gas stream is at least 1,000° C., preferably at least 1,300° C. when, for example, it is desired to produce ultrafine glass fibers. If the temperature of the second high-speed gas stream is too high, the fibers are again dissolved and their surface tension becomes predominant. Consequently, the fibers becomes ball-like.

Preferred embodiments of the fiberizing apparatus used conveniently in practicing the process of this invention are shown below.

(1) Diameters and lengths of the orifice and nozzles

Diameter of the flowout orifice for molten glass ($D_L$ in FIG. 2): 0.4–2.5 mm, preferably 0.5–1.5 mm.

Diameter of each of the first group gas jet nozzles ($D_G$ in FIG. 2): 0.2–1.5 mm, preferably 0.5–0.8 mm Length of the first group gas jet nozzle ($L_G$ in FIG. 2): 1–7.5 mm, preferably 2.5–4.0 mm.

(2) Relative positions of the first gas jet nozzles in the cut section

Distance between the axes in the opening surface ($B_G$ in FIG. 2): 1–5 mm, preferably 2–4 mm.

Angle ($\alpha$ in FIG. 2) formed between a phantom plane perpendicular to the axis of the flowout orifice and the axis of the first gas jet nozzle: 20°–70°, preferably 35°–55°.

Perpendicular distance between the opening surface and the first convergence point ($L_F$ in FIG. 2): 0.5–3 mm, preferably 1–2 mm.

(3) Relative position of the second blast in the cut section

Distance between the opening surface of the first gas jet nozzle and the upper end of the opening surface of the second blast ($L_B$ in FIG. 2): 0.6–5 mm, preferably 1–3 mm, provided that $L_B$ is greater than $L_F$.

Diameter of the opening surface of the second blast ($S_B$ in FIG. 2): 1–10 mm, preferably 1.5–5 mm.

Distance between the axis of the flowout orifice and the opening surface of the second blast ($S_L$ in FIG. 2): 1.5–20 mm, preferably 2–10 mm.

Angle ($\beta$ in FIG. 2) formed between the gas flowing central axis of the second blast and a phantom plane perpendicular to the axis of the flowout orifice: 0°–60°, preferably 0°–45°, most preferably 0°–15°.

(4) Relative position of the gas jet nozzles on the plane

Distance between the axes of two first gas jet nozzles within a phantom plane passing through the first convergence point and being perpendicular to the axis of the flowout orifice ($S_G$ in FIG. 1): 0.5–2 mm, preferably 0.7–1.5 mm.

Distance between adjoining flowout orifices (P in FIG. 1): 1.0–10 mm, preferably 1.5–5 mm.

The present invention can be applied to various viscous materials. For example, when glass is used as a viscous material, the first gas may be maintained at a pressure (the pressure within the orifices 4,4' in FIG. 2) of 1.0 to 2.0 kg/cm², for example 1.5 kg/cm², and a temperature (the temperature within the orifices 4,4' in FIG. 2) of 1150° to 1250° C., and the second gas may be maintained at a pressure (the pressure of the inside of 8 in FIG. 2) of 0.2 to 0.5 kg/cm2, for example 0.3 kg/cm², and a temperature (the temperature of the inside of 8 in FIG. 2) of 1600° to 2000° C. When the viscous material is a thermoplastic material such as polyethylene terephthalate, the temperature of the first gas is about 300° C., and the temperature of the second gas is 400° to 500° C. The pressures of these gases may be the same as those described above for glass. Under the above conditions, the kinetic energy per unit area of the first gas is about twice that of the second gas.

In the fiberizing apparatus shown in FIGS. 1 and 2 which is used conveniently in this invention, molten glass 2 which has been melted in a glass melting pot (not shown) and flowed into a fiberizing device (platinum pot) 1 flows out from the flowout orifice 3, and fed from a high-temperature high-pressure gas generating device (not shown) through an inlet (not shown). It passes through manifolds 7 and 7', first undergoes the action of the first high-speed gas streams at high temperature and high pressure jetted from first gas jet nozzles 4 and 4' and is fiberized while forming a cone 10. Then, by the action of a second high-speed gas stream at high temperature jetted out from a a second blast 8, it is further heated and stretched into very fine glass fibers.

Figure 3:
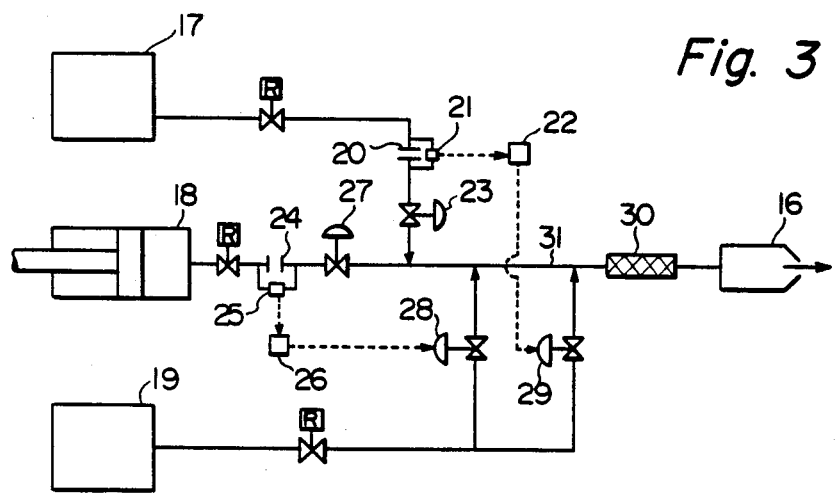
FIG. 3 is a rough sketch of a device for preparing a high-speed gas stream, which illustrates the preparation of a second high-speed gas stream by using a molecular oxygen-enriched gas in the fiberizing apparatus used in this invention.

FIG. 3 is a rough sketch of a high-speed gas stream preparing device for preparing the second high-speed gas stream by using a molecular oyxgen-enriched gas in the fiberizing apparatus used by the process of this invention.

Air compressed by a compressor 18 is sent to a mixer 30 through a main pipe 30 only in the required amount set by a flow regulating valve 27. The amount of flow of the compressed air is detected by an orifice 24 and a differential pressure generator 25. The degree of opening of a first flow rate regulating valve 28 for a fuel suchs as butane from a fuel tank 19 is adjusted according to the desired rate of fuel feeding prescribed by a flowmeter/rate prescribing device 26 to conform to the detected amount of flow of compressed air and the required amount of the fuel is supplied to the main pipe 31. In the meantime, oxygen from an oxygen as generator 17 is sent to the mixer through the main pipe 31 in the required amount controlled by an oxygen amount regulating valve 23. The amount of flow oxygen is detected by an orifice 20 and a differential pressure generator 21. The degree of opening of a second fuel flow amount regulating valve 29 is adjusted according to the desired rate of fuel feeding prescribed by a flowmeter/rate prescribing device 22 to conform to the detected amount of flow of oxygen, and the required amount of the fuel is supplied to the main pipe 31. The fuel, air and oxygen are intimately mixed by the mixer 30 and burnt within an outlet nozzle 16 to give the second high-speed gas stream at a temperature.

When the molten glass is fiberized by using the process for producing fibers in accordance with this invention, very fine fibers having a diameter of 2.0 micrometers or less can be easily obtained. Such fine fibers cannot be obtained by using a fiberizing apparatus having only the first group of gas jet nozzles, or a fiberizing apparatus having the first group of gas jet nozzles and auxiliary gas jet nozzles. The thermal energy required for heating and stretching is ⅛ to ¼ of that required in the flame attenuation process and is less than about ½ of that required in the toration process, and very fine fibers of the same quality as in these processes can be obtained in accordance with the present invention.

What we claim is:

1. A process for producing fine fibers, which comprises
   (1) allowing a viscous material to flow out from a flowout orifice,
   (2) blowing a rectilinear first high-speed gas stream from each of at least three circumferentially spaced gas jet nozzles disposed around the flowout orifice to reduce abruptly the cross-sectional area of a first fine stream of the viscous substance that has flowed out, and to form a second fine stream of the viscous material having a reduced cross sectional area, said first high-speed gas stream having the following two vector components,
      (A) a tangential component along the outer circumference of that section of said first fine stream of the viscous substance which crosses the axis of said first fine stream, and
      (B) a component first gradually approaching the axis of said first fine stream in the flowing direction of the viscous material and then gradually moving away from said axis, and
   (3) blowing a second high-speed gas stream against said second fine stream of a reduced cross-sectional area from across the axis of the first fine stream of the viscous material at a position downstream of that position at which the first high-speed gas stream most approaches the axis of the first fine stream of the viscous material when viewed in the flowing direction of the viscous material, thereby to thin the second fine stream further.

2. The proces of claim 1 which further comprises a step, to be carried out before step (3), of jetting a plurality of auxiliary high-speed gas streams having a second convergence point closest to the axis of the first fine stream below the first convergence point or being substantially parallel to the axis of the flowout orifice from a plurality of auxiliary gas jet nozzles provided outwardly of the aforesaid at least three gas jet nozzles and thereby causing them to meet the second fine stream formed by the first high-speed gas stream before it substantially contacts the second high-speed gas stream.

3. The process of claim 1 wherein the second high-speed gas stream is a high-temperature gas prepared by burning a fuel with a molecular oxygen-enriched gas containing at least 0.22% by volume of molecular oxygen gas.

* * * * *